(12) United States Patent
Wong et al.

(10) Patent No.: US 9,675,201 B2
(45) Date of Patent: Jun. 13, 2017

(54) SYSTEM AND METHOD FOR PREPARING A PREDETERMINED QUANTITY OF BEVERAGE

(75) Inventors: Kon Euan Gerard Wong, Burwood East (AU); Guido Brandt, Bentleigh East (AU); Hendrik Cornelis Koeling, Amersfoort (NL); Ralf Kamerbeek, De Meern (NL); Arend Cornelis Jacobus Biesheuvel, Werkendam (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/329,090

(22) Filed: Dec. 16, 2011

(65) Prior Publication Data

US 2012/0263833 A1 Oct. 18, 2012

Related U.S. Application Data

(63) Continuation of application No. PCT/NL2009/050829, filed on Dec. 30, 2009.

(30) Foreign Application Priority Data

Jun. 17, 2009 (EP) .................................... 09162934
Jun. 17, 2009 (EP) .................................... 09162982
(Continued)

(51) Int. Cl.
*A47J 31/34* (2006.01)
*B65D 85/804* (2006.01)
(Continued)

(52) U.S. Cl.
CPC ......... *A47J 31/3695* (2013.01); *A47J 31/368* (2013.01); *A47J 31/3676* (2013.01);
(Continued)

(58) Field of Classification Search
CPC .............. B65D 85/804; B65D 85/8043; B65D 85/8046; A23F 5/26; A47J 31/40; A47J 31/407
(Continued)

(56) References Cited

U.S. PATENT DOCUMENTS 2,292,101 A 8/1942 Brown
2,926,088 A * 2/1960 Spiselman .................... 426/132
(Continued)

FOREIGN PATENT DOCUMENTS

CA 2686347 12/2008
CN 1640350 7/2005
(Continued)

OTHER PUBLICATIONS

English Translation of Office Action for Chinese Application No. 200980160960.1, dated Sep. 29, 2013, 7 pages.
(Continued)

*Primary Examiner* — David Angwin
*Assistant Examiner* — John J Norton
(74) *Attorney, Agent, or Firm* — Foley & Lardner LLP

(57) ABSTRACT

A system for preparing a predetermined quantity of beverage comprises an exchangeable capsule and a fluid dispensing device for supplying an amount of fluid to the exchangeable capsule, a receptacle for holding the exchangeable capsule, and an outlet arrangement for supplying the beverage to a container, such as a cup. The capsule comprises a circumferential wall, a bottom, a lid, an entrance area and a closed exit area. The circumferential wall, the bottom and the lid enclose an inner space that comprises an extractable product. The fluid dispensing device supplies fluid to the extractable product for preparing the beverage. In use, the outlet arrangement is in fluid communication with the exit area for draining the prepared beverage from the capsule. The cap-
(Continued)

sule further comprises an opening element through the closed exit area for draining the prepared beverage from the capsule.

7 Claims, 6 Drawing Sheets

(30) Foreign Application Priority Data

Jun. 17, 2009 (EP) .................................... 09162995
Jun. 17, 2009 (EP) .................................... 09162998

(51) Int. Cl.
*A47J 31/36* (2006.01)
*B65D 77/32* (2006.01)
*B65D 77/38* (2006.01)
*B65D 65/46* (2006.01)

(52) U.S. Cl.
CPC ........ *A47J 31/3685* (2013.01); *B65D 65/466* (2013.01); *B65D 77/32* (2013.01); *B65D 77/38* (2013.01); *B65D 85/8043* (2013.01); *B65D 85/8046* (2013.01)

(58) Field of Classification Search
USPC .............................. 99/295, 302 R, 302 P, 323
See application file for complete search history.

(56) References Cited

U.S. PATENT DOCUMENTS

| | | | |
|---|---|---|---|
| 3,373,043 A * | 3/1968 | Rubenstein ........ | B65D 85/8043 426/412 |
| 3,615,708 A | 10/1971 | Abile-gal | |
| 4,136,202 A * | 1/1979 | Favre ............... | 426/77 |
| 4,321,139 A | 3/1982 | Auclair | |
| 4,417,504 A | 11/1983 | Yamamoto | |
| 4,859,337 A | 8/1989 | Woltermann | |
| 5,010,221 A * | 4/1991 | Grossman et al. ........... | 219/689 |
| 5,010,331 A | 4/1991 | Dias et al. | |
| 5,242,702 A | 9/1993 | Fond | |
| 5,243,164 A * | 9/1993 | Erickson et al. ............. | 219/689 |
| 5,325,765 A | 7/1994 | Sylvan et al. | |
| 5,605,710 A * | 2/1997 | Pridonoff et al. ............. | 426/86 |
| 5,840,189 A | 11/1998 | Sylvan et al. | |
| D408,679 S | 4/1999 | Potts et al. | |
| 6,079,315 A | 6/2000 | Beaulieu et al. | |
| 6,082,247 A | 7/2000 | Beaulicu | |
| 6,142,063 A | 11/2000 | Beaulieu et al. | |
| 6,182,554 B1 | 2/2001 | Beaulieu et al. | |
| D452,433 S | 12/2001 | Lazaris | |
| D452,434 S | 12/2001 | Sweeney | |
| 6,440,256 B1 | 8/2002 | Gordon et al. | |
| D462,865 S | 9/2002 | Honan et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,644,173 B2 | 11/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| D489,215 S | 5/2004 | Honan et al. | |
| D502,362 S | 3/2005 | Lazaris et al. | |
| D513,572 S | 1/2006 | Schaffeld et al. | |
| 7,165,488 B2 | 1/2007 | Bragg et al. | |
| D544,299 S | 6/2007 | Schaffeld et al. | |
| D554,299 S | 10/2007 | Ragonetti et al. | |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,398,726 B2 | 7/2008 | Streeter et al. | |
| 7,490,542 B2 * | 2/2009 | Macchi et al. ................. | 99/295 |
| 7,513,192 B2 | 4/2009 | Sullivan et al. | |
| 7,523,695 B2 | 4/2009 | Streeter et al. | |
| 7,543,527 B2 | 6/2009 | Schmed | |
| 7,552,672 B2 | 6/2009 | Schmed | |
| 7,640,845 B2 | 1/2010 | Woodnorth et al. | |
| 7,681,492 B2 * | 3/2010 | Suggi Liverani .. | B65D 85/8043 426/115 |
| 7,856,920 B2 | 12/2010 | Schmed et al. | |
| 7,964,230 B2 * | 6/2011 | Kirschner ............ | B65D 85/804 426/433 |
| 8,667,890 B2 * | 3/2014 | Macchi .......................... | 99/295 |
| 2003/0039731 A1 * | 2/2003 | Dalton et al. ................. | 426/433 |
| 2003/0172813 A1 * | 9/2003 | Schifferle ....................... | 99/275 |
| 2004/0045443 A1 | 3/2004 | Lazaris et al. | |
| 2004/0115317 A1 | 6/2004 | Doglioni | |
| 2005/0051478 A1 * | 3/2005 | Karanikos et al. ........... | 210/469 |
| 2005/0150390 A1 | 7/2005 | Schifferle | |
| 2005/0172822 A1 | 8/2005 | Macchi et al. | |
| 2005/0205601 A1 | 9/2005 | Taylor | |
| 2005/0266122 A1 * | 12/2005 | Franceschi ...................... | 426/77 |
| 2005/0287251 A1 | 12/2005 | Lazaris et al. | |
| 2006/0065127 A1 * | 3/2006 | Dalton et al. ................. | 99/279 |
| 2006/0174769 A1 * | 8/2006 | Favre et al. .................... | 99/275 |
| 2006/0174773 A1 | 8/2006 | Taylor | |
| 2006/0292012 A1 | 12/2006 | Brudevold et al. | |
| 2008/0095904 A1 | 4/2008 | Sullivan et al. | |
| 2008/0115674 A1 | 5/2008 | Huang et al. | |
| 2008/0134902 A1 | 6/2008 | Zimmerman et al. | |
| 2009/0095164 A1 * | 4/2009 | Celeste ............... | 99/285 |
| 2009/0126578 A1 * | 5/2009 | Amann et al. .................. | 99/295 |
| 2009/0229472 A1 * | 9/2009 | Ferrara, Jr. ..................... | 99/323 |
| 2009/0235827 A1 * | 9/2009 | Bongers et al. ................ | 99/316 |
| 2010/0024658 A1 | 2/2010 | Jacobs et al. | |
| 2010/0303964 A1 * | 12/2010 | Beaulieu et al. ............... | 426/77 |

FOREIGN PATENT DOCUMENTS

| | | |
|---|---|---|
| CN | 101155536 | 4/2008 |
| EP | 1 555 219 | 7/2005 |
| EP | 1 767 467 | 3/2007 |
| EP | 1555219 B1 | 6/2011 |
| FR | 2617389 | 1/1989 |
| FR | 2617389 A1 * | 1/1989 |
| JP | 61-280812 A | 12/1986 |
| JP | 62-213713 A | 9/1987 |
| JP | 2001-061663 A | 3/2001 |
| JP | 2004-500199 A | 1/2004 |
| JP | 2004-534697 | 11/2004 |
| JP | 2005-199071 A | 7/2005 |
| WO | WO-01/60712 A1 | 8/2001 |
| WO | WO-02/081337 A1 | 10/2002 |
| WO | WO-03/073896 | 9/2003 |
| WO | WO 03073896 A1 * | 9/2003 |
| WO | WO-2006/137737 | 12/2006 |
| WO | WO 2006/137737 A2 | 12/2006 |
| WO | WO-2007/096196 A2 | 8/2007 |
| WO | WO-2007/113100 A2 | 10/2007 |
| WO | WO 2008132571 A1 * | 11/2008 |
| WO | WO-2009/110783 | 9/2009 |
| WO | WO 2009/110783 A2 | 9/2009 |

OTHER PUBLICATIONS

English Translation of Office Action for Korean Patent Application No. 10-2012-7001327, no date, 2 pages.
Office Action for European Patent Application No. 09796122.1-1656, dated Jul. 5, 2013, 5 pages.
Search Report for Chinese Application No. 200980160960.1 dated Sep. 6, 2013, 2 pages.
Written Opinion for Singapore Patent Application No. 201109327-5, mail date Oct. 11, 2013, 6 pages.
Japanese Office Action and Translation thereof for Japanese Application No. 2012-0516015, dated Jul. 25, 2013, 10 pages.

(56) References Cited

OTHER PUBLICATIONS

International Search Report for Application No. PCT/NL2009/050829, dated Mar. 1, 2010, 2 pages.
European Search Report for Application No. EP14167018, mail date Aug. 14, 2014, 7 pages.
Notice of the Reasons for Rejection for Japanese Patent Application No. 2012-516015, mail date Aug. 6, 2014, with English Translation, 7 pages.
Second Office Action for Chinese Application No. 2009801609601, with English translation, mail date Aug. 5, 2014, 18 pages.
English Translation of Office Action received in Mexican patent application No. MX/a/2011/013567, no date, 3 pages.
Office Action from Korean Patent application No. 10-2012-7001327 with English Translation, dated Apr. 18, 2014, 4 pages.
Official Action received in Russian Patent application No. 2012101445/12(001950) with English Translation, dated Mar. 25, 2014, 9 pages.

* cited by examiner

PRIOR ART

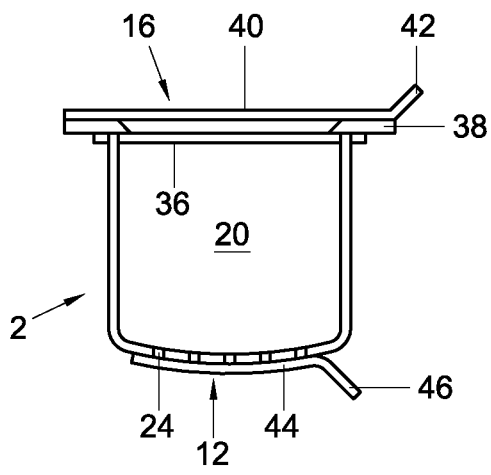
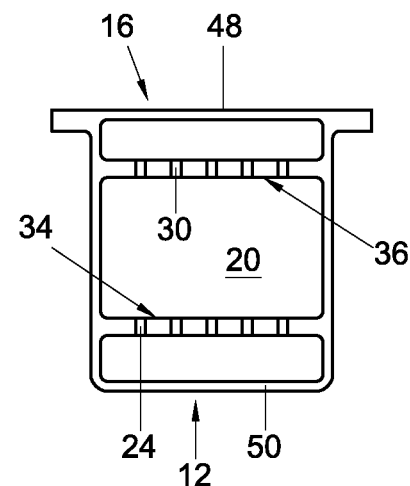
Fig. 3  Fig. 4
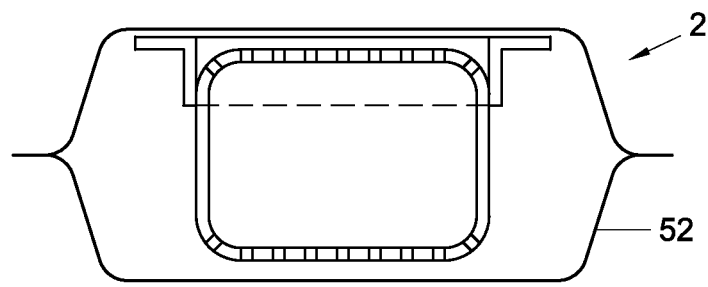
Fig. 5
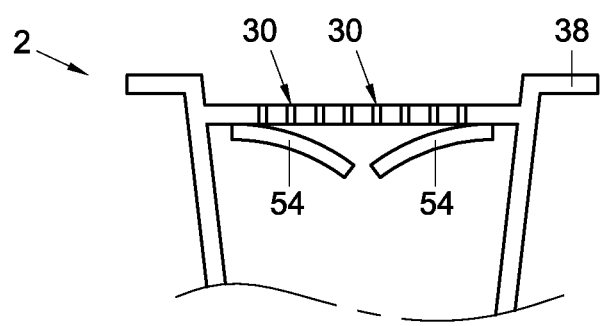
Fig. 6

SYSTEM AND METHOD FOR PREPARING A PREDETERMINED QUANTITY OF BEVERAGE

CROSS-REFERENCE TO RELATED APPLICATIONS

The present application is a continuation of International Patent Application No. PCT/NL2009/050829 filed on Dec. 30, 2009 (which is hereby incorporated herein by reference); which claimed priority to European Application Nos. 09162934.5, 09162998.0, 09162995.6, 09162982.4, all filed on Jun. 17, 2009 and all of which are hereby incorporated herein by reference.

FIELD OF THE INVENTION

The invention concerns a system for preparing a predetermined quantity of beverage suitable for consumption using an extractable product. The system comprises an exchangeable capsule. The system further comprises an apparatus comprising a fluid dispensing device for supplying an amount of fluid, such as water, to the exchangeable capsule, a receptacle for holding the exchangeable capsule, and an outlet arrangement for supplying the beverage to a container, such as a cup. The capsule comprises a circumferential wall, a bottom, a lid, an entrance area and a closed exit area. The circumferential wall, the bottom and the lid enclose an inner space that comprises an extractable product. The system is arranged for bringing the fluid dispensing device in fluid connection with the entrance area for supplying the fluid to the extractable product for preparing the beverage. The system is further arranged so that, in use, the outlet arrangement is in fluid communication with the exit area for draining the prepared beverage from the capsule.

The invention further concerns a method of preparing a predetermined quantity of beverage suitable for consumption using an extractable product. The method comprises an exchangeable capsule, comprising a circumferential wall, a bottom, a lid, an entrance area and a closed exit area, wherein the circumferential wall, the bottom and the lid enclose an inner space that is provided with an extractable product. The method further comprises an apparatus comprising a receptacle for holding the exchangeable capsule, a fluid dispensing device for supplying an amount of fluid, such as water, to the exchangeable capsule, and an outlet arrangement which in use, is in fluid communication with the capsule for draining the prepared beverage from the capsule and supplying beverage to a container such as a cup. The apparatus is arranged for bringing the fluid dispensing device in fluid connection with the entrance area of the capsule for supplying the fluid to the extractable product for preparing the beverage.

BACKGROUND

In the art hermetically sealed capsules comprising ground coffee, for placement in a coffee dispensing apparatus, are known. During coffee preparation the entrance area of such sealed capsule is pierced, so that entrance openings are provided for supplying fluid under pressure to the grounded coffee in the inner space of the capsule. This in turn causes the pressure in the inner space of the capsule to rise, such that an exit area of the capsule is pressed against lid piercing means that are present in the apparatus. When sufficient pressure is applied, the exit area will tear against the lid piercing means creating exit openings through which the coffee drink can drain from the capsule through an outlet present in the apparatus. In use, the outlet is in fluid communication with the exit area of the receptacle so that coffee drink may flow through the outlet.

It has been found that in a system as explained above, preferential paths of fluid may flow through the extractable product within the capsule, e.g. from the at least one entrance opening to the at least one exit opening, which may lead to undesired strength of the prepared beverage and/or variations in strength of the prepared beverage, from one capsule to another. Moreover, since the exit openings are formed by fluid pressure, the number, position and/or size of the exit openings are formed by chance.

It is therefore one of the goals of the invention to provide for an alternative system, capsule and method.

SUMMARY

According to a first aspect, a system may comprise a capsule having an opening element arranged for providing at least one opening through the otherwise closed exit area. This opening element may be present in the capsule itself, instead of in the receptacle or outlet arrangement. The opening element may comprise an additional feature or adjustment to the capsule. The opening element itself may open the exit area. Through the at least one exit opening that is formed, the prepared beverage may be drained from the capsule, through the outlet arrangement, and into a container. Equipping the capsule with an opening element may provide for a predetermined number of exit openings, a pre-determined position of each exit opening and/or a pre-determined size of the exit openings, e.g. instead of mainly relying on inner fluid pressure of the capsule.

The arrangement of exit openings may be pre-determined independent of the apparatus. The number, position and/or size of the exit openings may for example be determined on the basis of the type of extractable product, the grain-size of the extractable product, the desired strength of the beverage, etc. The capsule that carries such extractable product may comprise one or more opening elements that may provide for that predetermined number, position and/or size of exit openings. Furthermore, the opening element may form exit openings, independent, or partly independent of the built-up pressure inside the capsule. Multiple opening portions may be provided.

The capsule may be sealed with respect to ambient environment. Preferably the enclosure is fluid and/or air tight, such that the extractable product may remain substantially in tact, preferably with substantially no loss of flavour or extractability, during a relative long period before use. Only just before use, or during use, the opening element may be activated so that beverage may flow through the exit area.

In one embodiment, the opening element is arranged to be activated manually, for example before operating the apparatus. In another embodiment, the opening element is arranged to be activated by the apparatus, for example during operation.

In an embodiment, the exit area may be provided in the lid of the capsule, and/or in part of the circumferential wall. The exit area may further comprise an exit filter for retaining the extractable product and draining the beverage. The entrance area may be provided in the bottom of the capsule and/or in part of the circumferential wall. The entrance may comprise an entrance filter for allowing pressurized fluid to pass and retaining the extractable product.

In an embodiment, the opening element may be separate from the exit filter and/or the lid. For example, the opening element may be at least partly moved to open the exit area. In an embodiment, by at least partly moving the opening element the exit area may partly tear, snap, break or open. In a further embodiment, the apparatus may have moving elements, such as bottom piercing means and/or a receptacle. The opening element may be moved by the bottom piercing means and/or receptacle, to open the exit area.

In another embodiment, the opening element may be arranged to be at least partly moved away from respective exit openings that are provided in the exit filter. For example, the opening element may be arranged to be at least partly deformed, for example by heat and/or a reaction to fluid.

In yet another embodiment, the opening element may be integrated with the exit filter and/or the lid. In again another embodiment, the opening element may be arranged to be at least partly dissolved and/or degraded by the fluid from the fluid dispensing device for providing an opening through the exit area. For example, the exit openings may be provided in and/or against the exit filter, which openings are filled with dissolvable and/or degradable material. By supplying fluid to the exit filter, the exit openings may be opened.

In an embodiment, the same opening element may be arranged to provide an opening through the entrance area for supplying the fluid to the capsule, in particular to the extractable product, and through the exit area, for example at approximately the same time. In another embodiment, the opening element may comprise a first and a second opening element. In use, the first opening element may provide an opening through the entrance area, while the second opening element may provide an opening through the exit area.

The capsule may comprise a rigid rim and/or a rigid circumferential wall, so that the capsule may be supported by the receptacle. In use, the rim may be pressed between the receptacle and the outlet arrangement for holding the capsule in place while draining the beverage from the capsule.

In an embodiment, the receptacle comprises bottom piercing means intended for piercing the bottom of an alternative capsule for creating at least one entrance opening in the entrance area of the alternative capsule, for supplying the fluid to the extractable product through said at least one entrance opening. The capsule of the system is arranged so that, in use, the bottom of the capsule of the system is positioned at a distance from the bottom piercing means, such that it is not pierced by the bottom piercing means and stays intact.

In a further embodiment the receptacle comprises lid piercing means intended for piercing the exit area of an alternative capsule when the exit area is sufficiently pressed against the lid piercing means under the influence of pressure of the fluid and/or beverage in the capsule, so that at least one exit opening through which the beverage can drain from the alternative capsule is created in the exit area. Preferably, the lid piercing means and the capsule of the system are adapted to each other such that the lid, in use, is not pierced by the lid piercing means and stays intact.

The fluid dispensing device of the system may be arranged for supplying the fluid to the exchangeable capsule under a pressure of approximately 4-20 bars, preferably 5-18 bars, more preferably 6-15 bars. In an embodiment, pressure of 6 bars built-up in a suitable fluid dispensing device is supplied to the capsule. For example, the extractable product may comprise grinded coffee grains, and the system may be arranged for making an espresso and/or coffee type of beverage.

According to a second aspect, a method of preparing a predetermined quantity of beverage suitable for consumption using an extractable product is provided, wherein the method uses a capsule, which comprises an opening element that provides an opening through the exit area, after which the prepared beverage is drained from the capsule. Before use, the exit area may be closed. During use, or just before use, the opening element may be activated so that an opening is created through the exit area. Then, the fluid and/or beverage is drained from the capsule, through the exit opening to the outlet arrangement, and preferably, into a container such as a cup. By activating the opening element, e.g. by pushing, heating, moisturizing, pressurising, breaking, tearing, etc, the exit area and/or the entrance area may be opened.

Further embodiments of the invention and advantages thereof may be set out in the claims and description, with reference to the drawings.

BRIEF DESCRIPTION OF THE DRAWINGS

In the drawings:

FIG. 3 schematically shows a capsule in cross-sectional front view;

FIG. 4 schematically shows another capsule in cross-sectional front view;

FIG. 5 schematically shows yet another capsule in cross-sectional front view;

FIG. 6 schematically shows a part of yet another capsule in cross-sectional front view;

DESCRIPTION OF EXEMPLARY EMBODIMENTS

Figure 1A:
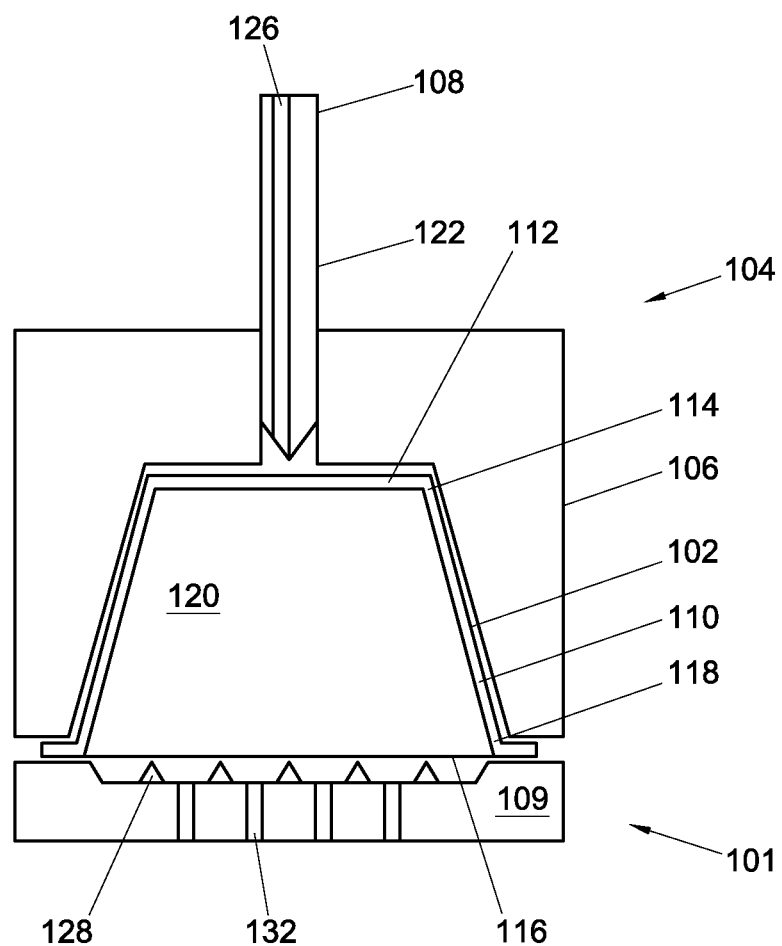
FIG. 1a-c schematically show a prior art system for preparing a beverage in cross-sectional front view.

In this description, identical or corresponding areas have identical or corresponding reference numerals. The exemplary embodiments shown should not be construed to be limiting in any manner and serve merely as illustration.

Figure 1B:
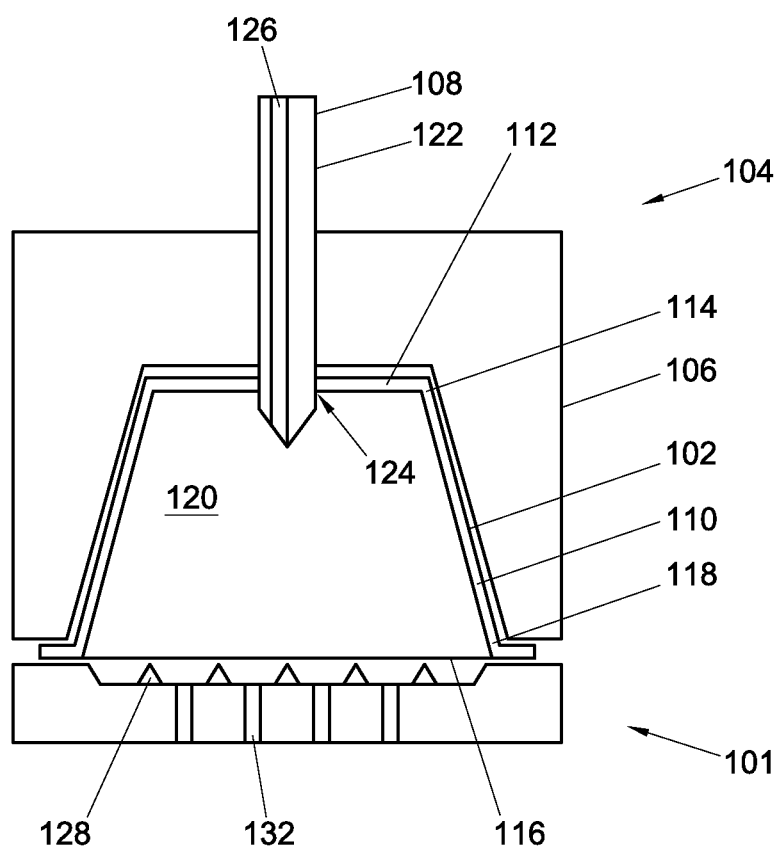
Figure 1C:
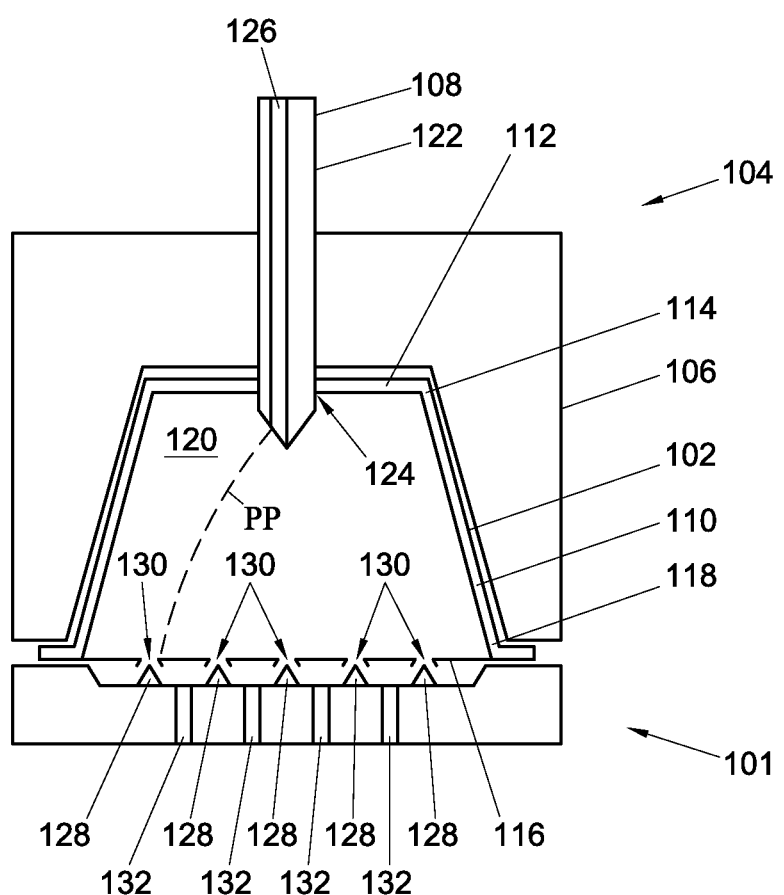

FIGS. 1a-1c show a prior art system 101 for preparing a predetermined quantity of beverage suitable for consumption using an extractable product. The system 101 comprises an exchangeable capsule 102, and an apparatus 104. The apparatus 104 comprises a receptacle 106 for holding the exchangeable capsule 102. In FIGS. 1a-1c a gap is drawn between the capsule 102 and the receptacle 106 for clarity. It will be appreciated that, in use, the capsule 102 may lie in contact with the receptacle 106. Commonly, the receptacle 106 has a shape complementary to the shape of the capsule 102. The apparatus 104 further comprises a fluid dispensing device 108 for supplying an amount of a fluid, such as water, under a pressure, of e.g. 9 bars, to the exchangeable capsule 102. Furthermore, an outlet apparatus 109 may be provided for providing fluid from the capsule 102 to a container such as a cup.

In the system 101 shown in FIGS. 1a-1c, the exchangeable capsule 102 comprises a circumferential wall 110, a bottom 112 closing the circumferential wall 110 at a first end 114, and a lid 116 closing the circumferential wall 110 at a second end 118 opposite the bottom 112. The circumferential wall 110, the bottom 112 and the lid 116 enclose an inner space 120 comprising the extractable product 20.

The system 101 of FIGS. 1*a*-1*c* comprises bottom piercing means 122 intended for piercing the capsule 102. FIG. 1*a* shows the bottom piercing means 122 in a retracted position. FIG. 1*b* shows the bottom piercing means 122 in an extended position for creating an entrance opening 124 in the bottom 112 for supplying the fluid to the extractable product 20 through the entrance opening 124. In FIGS. 1*a*-1*c* the piercing means 122 comprise a bore 126 through which the fluid can be supplied to the extractable product 20 contained in the inner space 120. The system 101 of FIGS. 1*a*-1*c* further comprises lid piercing means 128, here embodied as protrusions, intended for piercing the lid 116 of the capsule 102. In the shown embodiment, the lid piercing means 128 may form part of the outlet arrangement 109.

The system 101 shown in Figs. a-1*c* is operated as follows for preparing a cup of coffee, wherein the extractable product 20 is roasted and ground coffee.

The capsule 102 is placed in the receptacle 106 (see FIG. 1*a*). The bottom piercing means are activated to pierce the bottom 112 of the capsule 102 (see FIG. 1*b*) for creating the entrance opening 124. The fluid, here hot water under pressure, is supplied to the extractable product 20 in the inner space 120 through the entrance opening 124. The water will wet the coffee grounds and extract the desired substances to form the coffee beverage.

During supplying the water under pressure to the inner space 120, the pressure inside the capsule 102 will rise. The rise in pressure will cause the lid 116 to deform and be pressed against the lid piercing means 128. Once the pressure reaches a certain level, the tear strength of the lid 116 will be surpassed and the lid will rupture against the lid piercing means 128, creating exit openings 130 (see FIG. 1*c*). The prepared coffee will drain from the capsule 102 through the exit openings 130 and outlets 132 of the outlet arrangement 109, and may be supplied to a container such as a cup (not shown).

During preparation of the beverage in the system 101 shown in FIGS. 1*a*-1*c* preferential flow paths may exist in the extractable product 20 inside the inner space 120 of the capsule 102. These preferential paths may extend from the entrance opening 124 to the exit openings 130. One such possible preferential path is indicated with line PP in FIG. 1*c*.

Figure 2:
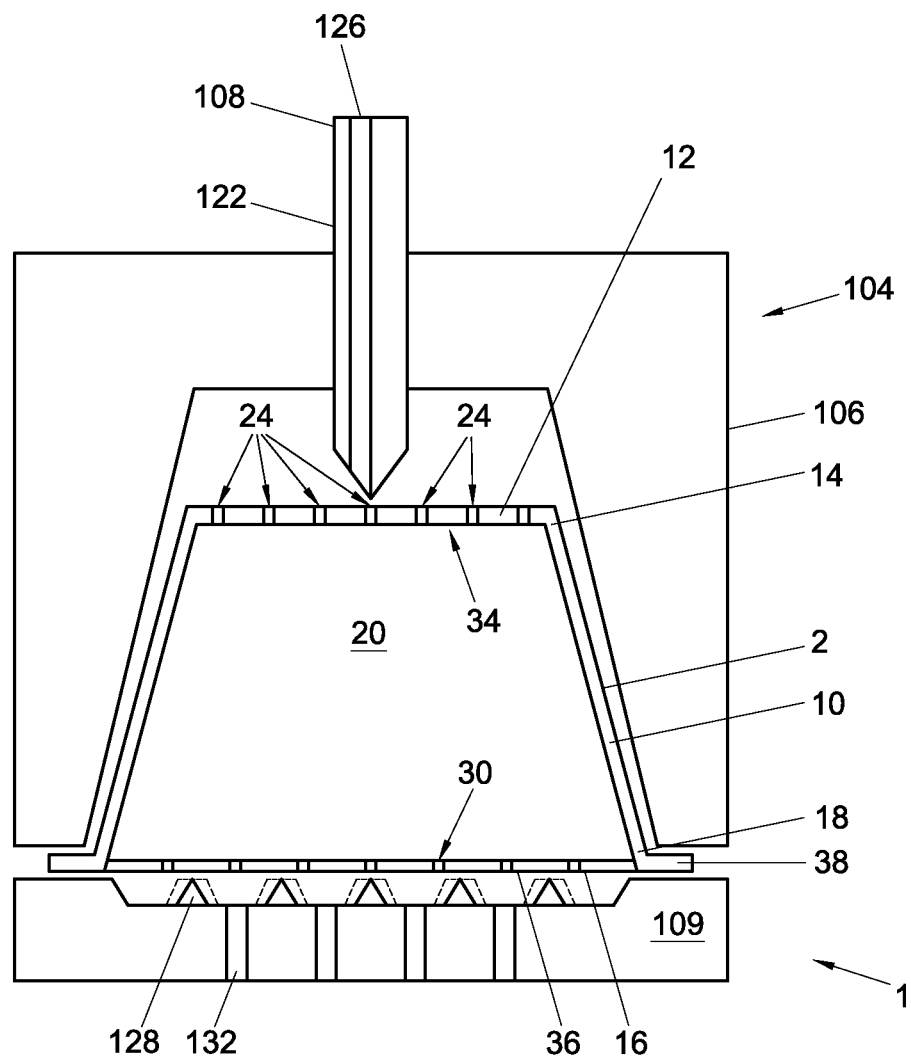
FIG. 2 schematically shows a system for preparing a beverage in cross-sectional front view.

FIG. 2 shows an example of a first embodiment of a system 1 for preparing a predetermined quantity of beverage suitable for consumption using an extractable product 20. The system 1 comprises an exchangeable capsule 2, and an apparatus 104. The capsule 2 is in an opened stated, wherein the opening elements (not shown in FIG. 2) were already activated for opening the exit and entrance area. The opening elements will be discussed here below.

The apparatus 104 comprises a receptacle 106 for holding the exchangeable capsule 2. In this example, the receptacle 106 has a shape complementary to the shape of the capsule 2. In FIG. 2 a gap is drawn between the capsule 2 and the receptacle 106 for clarity. It will be appreciated that, in use, the capsule 2 may lie in contact with the receptacle 106. The apparatus 104 further comprises a fluid dispensing device 108 for supplying an amount of a fluid, such as water, under pressure to the exchangeable capsule 2.

In the system 1 shown in FIG. 2, the exchangeable capsule 2 comprises a circumferential wall 10, a bottom 12 closing the circumferential wall 10 at a first end 14, and a lid 16 closing the circumferential wall 10 at a second end 18 opposite the bottom 12. The circumferential wall 10, the bottom 12 and the lid 16 enclose an inner space 20 comprising the extractable product 20. In this example, the exchangeable capsule 2 comprises an amount of extractable product 20 suitable for preparing a single portion of the beverage, preferably a single cup of the beverage, e.g. from 30-200 ml of the prepared beverage. The exchangeable capsule, thus, is a single-portion-pack.

According to an embodiment, the system 1 of FIG. 2 comprises bottom piercing means 122 intended for piercing the prior art capsule 102 as shown in FIGS. 1*a*-1*c*. FIG. 2 shows the bottom piercing means in an extended position, intended for creating the entrance opening 124 in the bottom 112 of the prior art capsule 102. According to a further embodiment, the capsule 2 comprises an entrance filter 34 which is positioned at a distance from the bottom piercing means 12, such that the capsule 2 is not pierced by the bottom piercing means 122 and the bottom 12 stays intact when the bottom piercing means is brought in the extended position. Hence, the entrance filter 34 provides for an entrance area. The entrance filter is provided with entrance openings 24 that may be formed by activating the entrance opening elements, as will be explained below.

In FIG. 2 the piercing means 122 comprise a bore 126 through which the fluid is supplied to an inner space of the receptacle 106. The fluid, here hot water under a pressure of e.g. more than 6 bars, will flow through the entrance filter 34 into the inner space 20 of the capsule 2 for extracting desired substances from the extractable product 20, in this example approximately 7 grams of roasted and ground coffee, for preparing, in this example the single cup of the beverage, here coffee.

Thus, more in general, in the example of FIG. 2, the bottom 12 comprises an entrance area, formed by the entrance filter 34, and the system 1 is arranged for bringing the fluid dispensing device 108 in fluid connection with the entrance area for supplying the fluid to the extractable product 20 for preparing the beverage.

In the example of FIG. 2, the circumferential wall 10 is substantially rigid. The circumferential wall may e.g. comprise a plastics material and may be formed by e.g. injection moulding, vacuum-forming, thermoforming or the like. In the example of FIG. 2 the bottom 12 is integral with the circumferential wall 10. In this example the entrance filter 34 is formed by a plurality of entrance openings 24 in the bottom 12, thus forming the entrance area. In this example the plurality of entrance openings 24 is distributed over substantially the entire bottom 12. In the shown embodiment, the fluid is supplied to the extractable product 20 via the plurality of entrance openings 24, which causes the extractable product 20 to be wetted over substantially the entire cross section of the capsule 2. Hence, a very homogeneous supply of fluid to the extractable product 20 is obtained. Thus, the risk of occurrence of preferential paths via which the fluid flows through the extractable product 20 is greatly reduced. In another embodiment, additional openings 24 may be provided in the circumferential wall 10, preferably near the bottom 12, so that the entrance area may be provided along the bottom 12 and along the circumferential wall 10.

In a further embodiment, which may be used in addition to the above described embodiments or separate thereof, the system 1 of FIG. 2 comprises lid piercing means 128 intended for piercing the lid 116 of the prior art capsule 102 when the lid 116 sufficiently presses against the lid piercing means 128 under the influence of the pressure of the fluid and/or beverage in the capsule 102 for creating at least one exit opening 130 through which the beverage can drain from the prior art capsule 102. According to an embodiment of the invention, the capsule 2 comprises an exit filter 36, comprising exit openings 30 through which the beverage can drain from the capsule 2. As will be explained below, the capsule may be provided with exit opening elements for opening these exit openings 30 prior to, or during, usage. The exit filter 36 may be arranged to having a sufficiently high tear strength not to be pierced by the lid piercing means 128 under the influence of the pressure inside the capsule 2. Alternatively, or additionally, the exit filter 36 forms a sufficiently low flow resistance for the beverage exiting the capsule 2, that the exit filter 36 is not pressed against the lid piercing means 128 with sufficient force to be pierced by the lid piercing means 128 and the lid stays intact. Hence, the exit filter 36 is adapted to the lid piercing means 128 such that the capsule 2, in use, is not pierced by the lid piercing means 128 and the lid 16 stays intact. More in general it applies that the exit filter 36 and the lid piercing means 128 are adapted to each other such that the capsule 2, in use, is not pierced by the lid piercing means 128 and the lid 16 stays intact.

In the example of FIG. 2 the exit filter 36, forming an exit area of the capsule 2, through which the beverage, here coffee, can drain from the capsule, is formed by a porous sheet, such as filter paper. In this example the entire lid 16 is formed as the exit filter 36. In the example of FIG. 2, the capsule 2 comprises an outwardly extending rim 38 at the second end 18, wherein the lid 16 is attached to the outwardly extending rim 38, e.g. by gluing, welding or the like. Hence, in this example the exit filter 36, i.e. the porous sheet, is attached to the outwardly extending rim 38.

In this example the exit filter 36 forms a substantially continuous fluid-permeable sheet spanning substantially the entire second, open end 18 of the capsule 2. Thus, the fluid can drain from the capsule 2 over a large area. Hence, a very homogeneous drain of beverage from the extractable product 20 is obtained. Thus, the risk of occurrence of preferential paths via which the fluid flows through the extractable product 20 is greatly reduced.

In an embodiment, parameters of the exit filter 36 of the capsule 2 of the system 1 can be chosen such that the exit filter 36 does not tear or rupture, e.g. has the sufficiently high tear strength and/or forming the sufficiently low flow resistance not to be pierced or torn. It will be appreciated that the lid and/or the exit filter 36 may deform against the lid piercing means, although it will not rupture or be torn. When the exit filter 36 is e.g. made of filtering paper, parameters of the filtering paper, such as density, thickness and/or PE-content, can easily be chosen to provide the exit filter 36 having the sufficiently high tear strength and/or forming the sufficiently low flow resistance. Alternatively, when the exit filter 36 is e.g. formed by a polymeric film provided with a plurality of exit openings, parameters of the polymeric foil, such as density, thickness, number of exit openings, size and/or shape of exit openings, can easily be chosen to provide the third wall having the sufficiently high tear strength and/or forming the sufficiently low flow resistance.

In the example of FIG. 2, the lid piercing means 128 are shown having sharp toothed points intended for piercing the lid. It will be appreciated that, alternatively, the lid piercing means 128 may have blunt piercing surfaces, e.g. as indicated with dashed lines in FIG. 2. In such embodiment, the prior art capsule 102 may, nevertheless, be pierced by the blunt piercing means 128, e.g. when the lid 116 consists of a sheet of aluminium foil. Parameters of the exit filter 36 of the capsule 2 of the system 1 according to an embodiment of the invention can be chosen such that the exit 36 filter has the sufficiently high tear strength and/or forms the sufficiently low flow resistance not to be pierced or torn. It will be appreciated that when the lid piercing means are blunt, the parameters of the exit filter may be chosen to suit these blunt piercing means. When the piercing means are blunt, the exit filter may e.g. be thinner than when the lid piercing means are sharp, while guaranteeing that the exit filter has the sufficiently high tear strength and/or forming the sufficiently low flow resistance not to be pierced or torn.

It is possible that the lid piercing means comprise ridges against which the lid, in use, abuts. Such ridges may be formed by the blunt piercing means 128 as shown with dashed lines in FIG. 2. The ridges may e.g. form at least 10%, possibly at least 25% of the portion of the surface of the receptacle 106 which, in use, coincides with the portion of the surface area of the lid 16 overlying the second, open, end 18. Hence, in use, the lid 16 may be supported by the ridges over, e.g. at least 10%, preferably at least 25%, of the portion the surface area of the lid 16 overlying the second, open, end 18. As already indicated, the lid 116 of the prior art capsule 102 may be pierced by such ridges, whereas parameters of the exit filter 36 of the capsule 2 of the system 1 according to an embodiment of the invention may easily be chosen such that the exit filter 36 has the sufficiently high tear strength and/or forms the sufficiently low flow resistance not to be pierced or torn. It will be appreciated that when the lid piercing means comprise ridges, the parameters of the exit filter may be chosen to suit such lid piercing means.

In the example of FIG. 2, the ridges comprise edges which are not sharp. In this example a radius of curvature of the edges is approximately 50 μm, although other radii are conceivable, such as 100, 200 or 500 μm. The prior art capsule 102 may, nevertheless, be pierced by the blunt piercing means 128, e.g. when the lid 116 consists of a sheet of aluminium foil. It will be appreciated that when the lid piercing means comprise non-sharp edges, the parameters of the exit filter 36 may be chosen to suit such lid piercing means. Parameters of the exit filter 36 of the capsule 2 of the system 1 according to an embodiment of the invention can be chosen such that the exit filter 36 has the sufficiently high tear strength and/or forming the sufficiently low flow resistance not to be pierced or torn.

It is also possible that the ridges of the lid piercing means 128 have a convex top against which the lid 16 abuts. Hence, when the lid 16, in use, is pressed against the ridges, the surface area over which the lid is supported by the ridges increases, thus reducing the local pressure exerted on the lid by the ridges. Thus it is possible to provide, in an easy manner, that the lid, in use, does not tear and/or rupture and stays intact.

Before the capsule 2 is positioned in the receptacle 106, the capsule 2 may be sealed, so that the extractable product 20 may remain in tact until preparation of the beverage. As shown in FIG. 3, the capsule 2 may comprise an exit opening element that is arranged for providing an opening 30 through the exit area for draining the prepared beverage. Before opening, the opening element closes the exit area. The opening element may comprise a seal 40. By taking off the seal 40 the openings 30 of the filter 36 are exposed and beverage may drain through. The seal 40 may be taken off manually, before placing the capsule 2 in the receptacle 106. The seal 40 may be provided with a lip 42, to be held between the fingers, for taking off the seal 40. The seal 40 may form a separate part, separate from the exit filter 36 and/or rim 38, i.e. that is separately formed from the exit filter 36 and/or the rim 38. The seal 40 may comprise a cap, foil or sheet or the like and may for example be made from paper, plastic and/or metallic foil. The seal 40 may be coupled to the capsule 2, in particular to the rim 38 in any suitable manner, for example by means of welding or gluing or the like.

As shown, an entrance area opening element may be provided for providing an opening through the entrance area for supplying the fluid to the capsule 2, through the otherwise closed entrance area. The entrance area opening element may comprise a second seal 44. By taking off the second seal 44, for example by pulling it by means of a second lip 46, the entrance openings 24 of the entrance filter 34 are exposed. The entrance seal 44 may have the same features as the exit seal 40. In an embodiment, the entrance and exit seal 44, 40 may be coupled to each other and/or together form one seal.

In another embodiment, the capsule 1 may have exit area opening element and/or an entrance area opening element that has to be pressed or teared manually to provide an opening through the exit area and/or the entrance area, respectively (see FIG. 4). Such opening element may comprise a sheet 48, 50, respectively. For example, by pressing or locally tearing the respective sheets 48, 50 the respective openings 30, 24 may be exposed so that fluid and beverage may flow in and out of the capsule 2. For example, the exit filter 36 and/or the entrance filter 34 may be made from relatively strong and/or thick material so as to not be teared and/or pushed through together with the respective opening element. For example, the exit filter 36 and/or the entrance filter 34 may comprise metal, and/or a strengthened paper, and/or plastic. The filter 34, 36 may for example be relatively thicker than the sheet 50, 48, respectively.

In another embodiment, the opening element may comprise a wrapper 52 (FIG. 5). The wrapper 52 may be formed by a surrounding foil, seal, paper or the like, that surrounds and seals the bottom 12, circumferential wall 10 and the lid 16. The wrapper 52 may seal the filters 34, 36 so that the extractable product 20 may remain in tact. Before usage, the wrapper 52 has to be removed to extract the extractable product 20. A rim 38 may be coupled to the circumferential wall 10 and/or lid 16 of the capsule 2. A separate, reusable rim 38 may be provided separately, wherein the separate rim may be coupled to a disposable capsule 52 before use, and be removed after use so that it may be reused. In another embodiment, every capsule 2 may be provided with a rim 38, wherein the whole of the capsule 2, including the rim 38 may be disposable.

In an embodiment, the opening element is arranged to be at least partly moved with respect to the exit area and/or entrance area for providing an opening 30, 24 through the exit and/or the entrance area, respectively, preferably while remaining at least partly coupled to the capsule. In FIG. 6 an opening element for the exit area is shown. Similarly, an opening element may be provided for the entrance area. For example, the capsule 2 may comprise opening elements that are activated by means of heat. When the heated water comes into contact with the opening elements, the opening elements at least partly move to expose the respective exit or entrance openings 30, 24. For example, the opening element may comprise a strip 54 of shape memory alloy and/or bi-metal, arranged to deform under influence of heat, i.e. when its temperature rises above a certain threshold temperature.

In a further embodiment, the opening element may for example comprise an element comprising a material that reacts to fluid and/or particular amounts of moist. For example, when the element comes into contact with a certain amount of fluid, the material may become relatively weak and hence deform, so that the exit and/or entrance area is opened, or the element may become weak under influence of the supplied fluid, after which it may be moved or deformed by the pressure of the pressurized fluid and/or moving of the extractable product 20.

In another embodiment, the opening element may comprise locally dried and/or pressurized extractable product 20, such as grains. The locally dried and/or pressurized extractable product 20 may block the exit and/or entrance openings 24, 30 so that the rest of the extractable product 20 in the inner space remains substantially in tact. The locally dried and/or pressurized material may become weak or fall apart under influence of fluid, so that the fluid may flow through the openings 24, 30 and extract flavour from the extractable product 20.

In a further embodiment, the opening element and the apparatus are arranged so that the apparatus moves the opening element for providing the opening through the exit and/or the entrance area. Moving parts of the apparatus may for example be the bottom piercing means 122 and/or the receptacle 106, or otherwise capsule 2 abutting parts of the apparatus 104.

Figure 7:
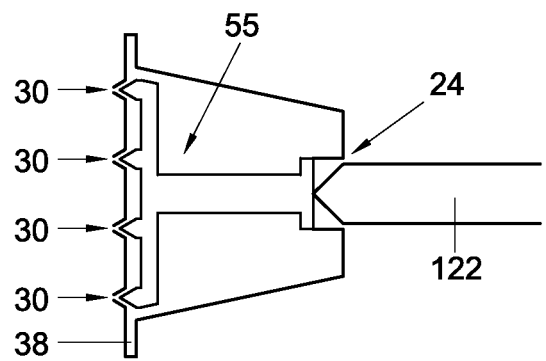
FIG. 7 schematically shows a capsule and bottom piercing means in cross-sectional front view.

In an embodiment, the opening element comprises an opening element for opening the entrance and/or the exit area. The opening element may comprise one integral part. Also, multiple opening elements may be provided, for example at least one for the entrance area and at least one for the exit area, wherein the opening elements may be coupled. The opening element may be activated by the bottom piercing means 122. For example, during use the bottom piercing means 122 may push the opening element away from the entrance area and/or towards the exit area (FIG. 7). By pushing the opening element away from the entrance area, at least one opening 24 may be provided in the entrance area. For example, the opening element may be teared loose from the bottom, or may be pushed out of its fitting. In a further embodiment, the exit area is also opened by the same pushing action. As shown in FIG. 7, the opening element 55 may pierce through the exit area by said pushing action, so that one or more exit openings 30 may be provided. In another embodiment, a similar opening element may be pushed manually or otherwise activated manually, before the capsule 2 is positioned in the receptacle 106.

In another embodiment (not shown), the capsule 2 is provided with an integral opening element. The system 1 may be arranged so that after placing the capsule 2 in the receptacle 106, the receptacle 106 is moved towards the outlet arrangement 109, so that the rim 38 may be clamped between the receptacle 106 and the outlet arrangement 109. By moving the receptacle 106 with the capsule 2 in the direction of the outlet arrangement 109, the apparatus may deform a local part of the capsule 2, which deformation may cause local tearing and/or breaking of the capsule 2 through the exit area and/or the entrance area. Here, the opening element may be integrally formed in the capsule 2, for example in and/or near the lid and/or bottom. For example, the opening element may comprise one or more protrusion that are put under stress while the receptacle 106 and the outlet arrangement 109 move with respect to each other, while pushing against the rim 38. The rim 38 may be arranged so that by pushing against, or clamping, the rim 38, the protrusion is put under stress, and the lid and/or the bottom may locally break, for example at an indentation near or at the protrusion.

Figure 8:
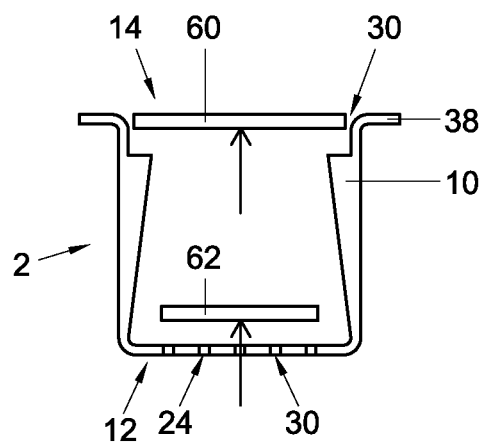
FIG. 8 schematically shows yet another capsule in cross-sectional front view.

In a further embodiment, a cover 60, 62 may be arranged for sealing the exit area and/or the entrance area, respectively (FIG. 8). For example, multiple covers may each cover exit openings 30 and entrance openings 24. When supplying fluid to the capsule 2 when it is placed in the receptacle 106, the covers may be moved away from the respective openings 30, 24 by the water pressure. Hence that the entrance and exit areas are opened and fluid and beverage may flow through the openings 30, 24.

Figure 9:
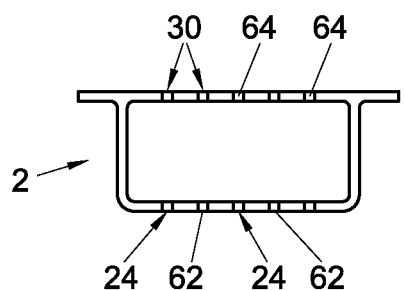
FIG. 9 schematically shows yet another capsule in cross-sectional front view.

In again a further embodiment, the opening element may be at least partly dissolvable, for example in fluid and/or pressurized fluid. In FIG. 9, dissolve opening elements 62, 64 are shown that are arranged to block each opening 24, 30. When fluid is supplied to the capsule 2, the dissolvable opening elements 62, 64 dissolve to allow passage of fluid and/or beverage. The dissolvable opening elements 62, 64 may be arranged at and/or in the openings 24, 30, preferably sealing the openings 24, 30.

In an embodiment, in addition to having an opening element for providing an opening through the exit area, the capsule 102 may be arranged such that it is pierced by the bottom piercing means 126 and/or by the lid piercing means 128. For example, the opening element may be arranged to provide an opening through the exit area, while the bottom 12 is arranged to be pierced by the bottom piercing means 126.

In the above description, sealing or 'closing' may be understood as sealing an opening substantially air tightly, or at least sealing the capsule 2 such that the extractable product 20

In the foregoing, the extractable product 20 may comprise an extractable coffee or tea product, such as roasted and ground and/or cut coffee beans, dried and/or cut tea leaves. The extractable product 20 may also comprise chocolate extracts, milk powder, or any other suitable extractable product 20. The extractable product 20 could further comprise any mixture of the foregoing and/or any of the foregoing products put in layers on top of and/or between each other. Also chemical products for adding flavour to a fluid may be included in the extractable product 20. The extractable product 20 may be compressed to fit in the capsule 2. The fluid that is added to the extractable product 20 to obtain the beverage may for example comprise hot or cold water, or milk. The obtained beverage may comprise, amongst others, a coffee drink, tea drink, chocolate drink, or another beverage.

The material of the capsule 2 may comprise cellulose, paper, cotton, and/or starch-based products. For example, the material of the capsule 4 may comprise biodegradable material. In another embodiment, the material of the capsule 4 may comprise plastics. The bottom 12 and the lid 14 may comprise an entrance and an exit filter 34, 36, respectively. The capsule 4 may for example be shaped by injection moulding, vacuum-forming, thermoforming, compression moulding, or the like. In the above description, integrally shaped may be understood as comprising that the respective parts of the capsule 2 are formed approximately at the same time, in one form process. For example, the respective parts may be moulded in the same mould. In another embodiment, different parts may be heat-sealed, glued or welded to form the capsule 2.

At least one of the filters 34, 36 may comprise a porous fluid permeable sheet. At least one of the filters 34, 36 may comprise filtering paper and/or polyethylene (PE) fibres. Substantially the whole surface of the bottom 12 and/or lid 14, at least for the part extending inside the circumferential wall 10, may be fluid permeable. The filters 34, 36 may also be made to be permeable when waters supplied under a specific pressure, for example a pressure of at least 6 bars. For example, at lower pressures fluid will not flow through the filter 34, 36. At least one of the filters 34, 36 may be flexible. The filter 34, 36 may comprise a polymeric foil.

It shall be obvious that the invention is not limited in any way to the embodiments that are represented in the description and the drawings. Many variations and combinations are possible within the framework of the invention as outlined by the claims. Combinations of one or more aspects of the embodiments or combinations of different embodiments are possible within the framework of the invention. All comparable variations are understood to fall within the framework of the invention as outlined by the claims.

What is claimed is:

1. A system for preparing a predetermined quantity of beverage suitable for consumption using an extractable product, comprising:
   an exchangeable capsule;
   an apparatus comprising a fluid dispensing device that supplies an amount of fluid to the exchangeable capsule, a receptacle that holds the exchangeable capsule, and an outlet arrangement that supplies the beverage to a container;
   wherein the exchangeable capsule comprises a circumferential wall, a bottom, a lid, an entrance area, and a closed exit area situated on the lid;
   wherein the circumferential wall, the bottom and the lid enclose an inner space that comprises the extractable product;
   wherein the exchangeable capsule further comprises an opening element that is arranged for providing an opening through the closed exit area for draining the prepared beverage from the exchangeable capsule;
   wherein the closed exit area is formed by an exit filter comprising exit openings;
   wherein the exit filter of the exchangeable capsule is structured as a boundary for the exchangeable capsule such that the exit filter of the exchangeable capsule separates the inner space from an outside environment external to the inner space;
   wherein the opening element is formed by a material sealing the exit openings of the exit filter of the exchangeable capsule, the material being at least one of partly dissolvable and degradable upon a supply of fluid from the fluid dispensing device for providing the opening through the exit area; and
   wherein the system is arranged for bringing the fluid dispensing device in fluid connection with the entrance area for supplying the fluid to the extractable product for preparing the beverage;
   wherein the system is further arranged so that, in use, the outlet arrangement is in fluid communication with the closed exit area for draining the prepared beverage from the exchangeable capsule;
   wherein the receptacle is also configured to use an alternative capsule having an alternative exit area;
   wherein the receptacle comprises a lid piercing protrusion configured to pierce the alternative exit area of the alternative capsule when the alternative exit area is sufficiently pressed against the lid piercing protrusion under an influence of a pressure of the fluid and/or beverage in the alternative capsule for creating at least one alternative exit opening through which the beverage can drain from the alternative capsule;
   wherein parameters of the exit filter of the exchangeable capsule are chosen such that the lid piercing protrusion and the exchangeable capsule of the system are adapted to each other such that the lid of the exchangeable capsule, in use, is not pierced by the lid piercing protrusion and stays intact such that the exit filter of the exchangeable capsule does not tear or rupture under the influence of pressure of the fluid and/or beverage in the exchangeable capsule.

2. The system of claim 1, wherein the entrance area is provided in the bottom of the exchangeable capsule.

3. The system of claim 1, wherein the exchangeable capsule comprises a substantially rigid rim that projects towards an outside of the exchangeable capsule from the edge of the circumferential wall.

4. The system of claim 1, wherein the circumferential wall is rigid so that, in use, deformation of the circumferential wall with respect to the receptacle is prevented.

5. The system of claim 1, wherein the receptacle comprises a bottom piercing element configured to pierce an alternative bottom of an alternative capsule for creating at least one entrance opening in the alternative bottom of the alternative capsule for supplying the fluid to the extractable product through said at least one entrance opening; wherein, in use, the bottom of the exchangeable capsule of the system is positioned at a distance from the bottom piercing element such that it is not pierced by the bottom piercing element and stays intact.

6. The system of claim 3, wherein the fluid dispensing device is arranged for supplying the fluid to the exchangeable capsule under a pressure of approximately 4-20 bars.

7. The system of claim 1, wherein the entrance area is formed by an entrance filter comprising entrance openings, wherein the entrance filter is structured as a boundary for the exchangeable capsule such that the entrance filter separates the inner space from an outside environment external to the inner space, wherein the exchangeable capsule further comprises a further opening element formed by the material sealing the entrance openings of the entrance, the material being at least one of partly dissolvable and degradable upon the supply of fluid from the fluid dispensing device, and wherein parameters of the entrance filter are chosen such that the entrance filter does not tear or rupture.

* * * * *